(12) United States Patent
Chu et al.

(10) Patent No.: US 8,858,305 B2
(45) Date of Patent: Oct. 14, 2014

(54) METHOD AND APPARATUS FOR PREPARING POULTRY SKIN

(71) Applicant: Tyson Foods, Inc., Springdale, AR (US)

(72) Inventors: Harry Y. Chu, Fayetteville, AR (US);
James Ruff, Farmington, AR (US);
Robert Ty Baublits, Colcord, OK (US);
Mark Andrew Christie, Elkins, AR (US)

(73) Assignee: Tyson Foods, Inc., Springdale, AR (US)

( * ) Notice: Subject to any disclaimer, the term of this patent is extended or adjusted under 35 U.S.C. 154(b) by 0 days.

(21) Appl. No.: 14/096,844

(22) Filed: Dec. 4, 2013

(65) Prior Publication Data

US 2014/0273782 A1 Sep. 18, 2014

Related U.S. Application Data

(62) Division of application No. 13/801,504, filed on Mar. 13, 2013, now Pat. No. 8,690,648.

(51) Int. Cl.
*A22C 21/00* (2006.01)

(52) U.S. Cl.
CPC ..................... *A22C 21/00* (2013.01)
USPC ...................................... 452/148

(58) Field of Classification Search
USPC .................... 452/141, 142, 148; 83/879–887
See application file for complete search history.

(56) References Cited

U.S. PATENT DOCUMENTS

| | | | |
|---|---|---|---|
| 1,908,283 A | 5/1933 | Burnes | |
| 2,176,751 A * | 10/1939 | Spang | 452/142 |
| 2,554,863 A * | 5/1951 | Lindner et al. | 452/142 |
| 2,690,011 A * | 9/1954 | Schulze | 83/438 |
| 2,811,743 A * | 11/1957 | Crabtree, Jr. | 452/142 |
| 2,998,041 A * | 8/1961 | Urschel et al. | 83/867 |
| 3,222,712 A * | 12/1965 | Deckert | 452/142 |
| 4,133,075 A | 1/1979 | Collins | |
| 4,313,963 A | 2/1982 | Greenspan | |
| 4,531,259 A * | 7/1985 | Bridge, Jr. | 452/142 |
| 4,660,253 A * | 4/1987 | LoBiondo et al. | 452/142 |
| 5,114,379 A | 5/1992 | Prosenbauer | |
| 5,342,236 A | 8/1994 | Repisky | |
| 5,738,578 A | 4/1998 | Marchese | |
| 6,036,591 A * | 3/2000 | Bonon et al. | 452/142 |
| 6,257,132 B1 | 7/2001 | Bifulco | |
| 7,070,495 B2 | 7/2006 | Kindermann | |
| 7,331,849 B2 | 2/2008 | Bifulco | |
| 7,410,414 B2 * | 8/2008 | Lagares Corominas | 452/142 |
| 7,806,754 B2 | 10/2010 | Stoughton | |
| 2005/0124276 A1 * | 6/2005 | Gagliardi | 452/142 |
| 2012/0276827 A1 * | 11/2012 | Borkiewicz et al. | 452/142 |
| 2013/0210327 A1 * | 8/2013 | Lagares Corominas | 452/142 |

* cited by examiner

*Primary Examiner* — Richard Price, Jr.
(74) *Attorney, Agent, or Firm* — Husch Blackwell LLP; Mark E. Stallion

(57) ABSTRACT

Penetrating the skin of a poultry item with an array of small holes accomplished by using a plurality of circular blades laterally spaced apart and substantially parallel and having a plurality teeth protruding from the edge of the blades and forcibly engaging and penetrating the skin of the poultry item with the plurality of teeth. The plurality of circular blades can have a common axis of rotation and rotating about a shaft extending along the common axis thereby forming a roller of blades.

6 Claims, 11 Drawing Sheets

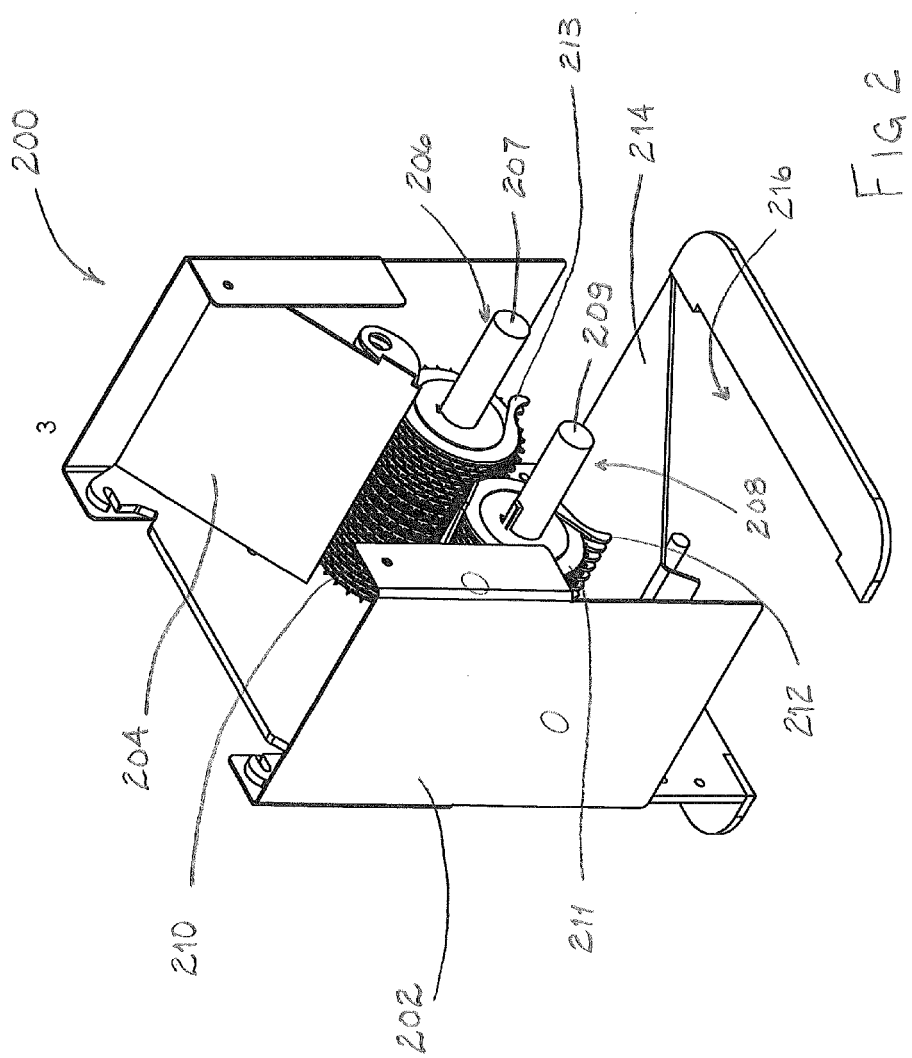

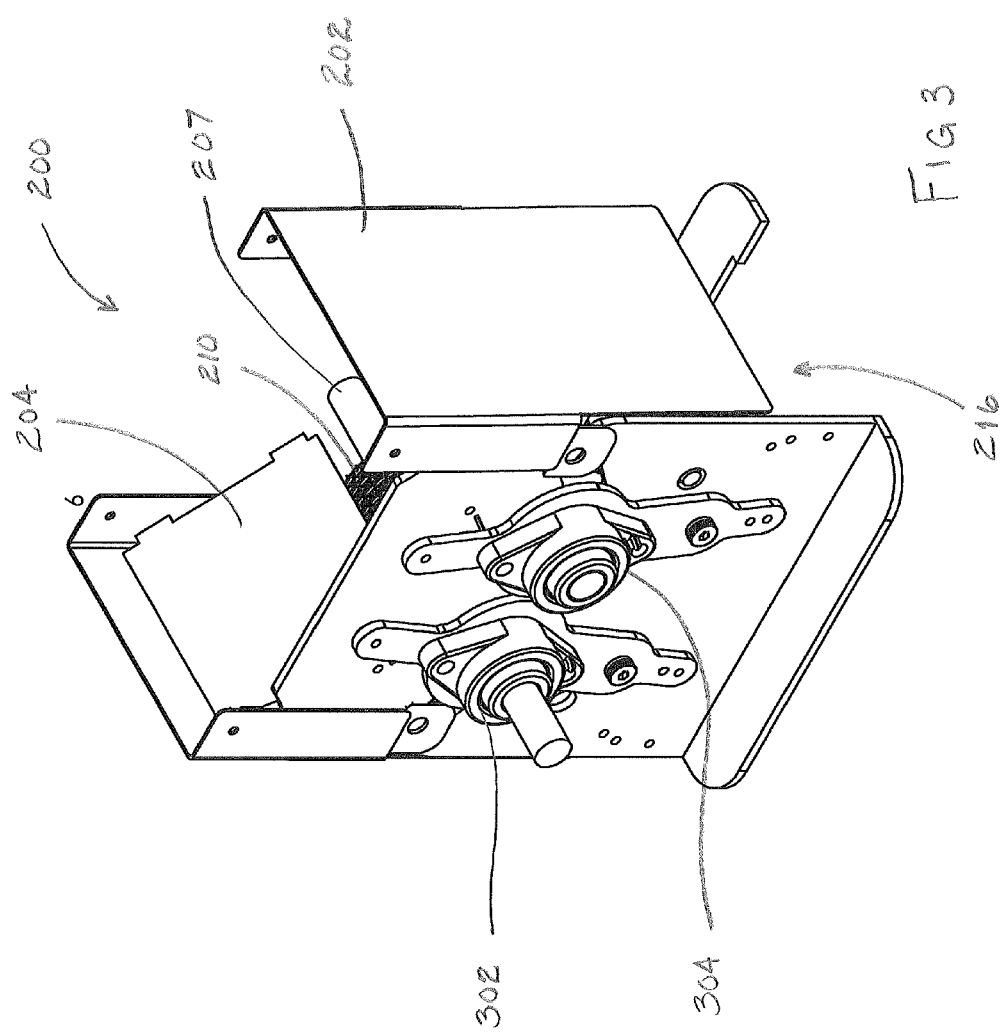

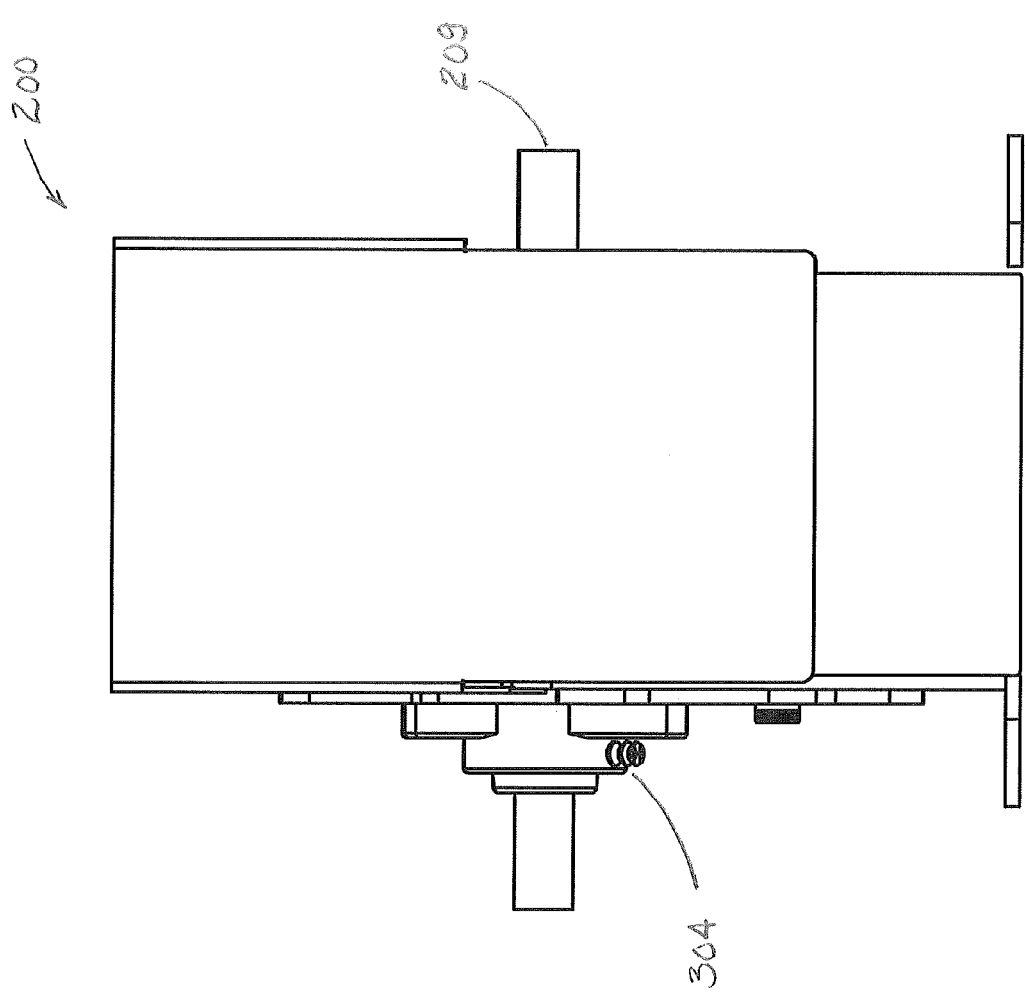

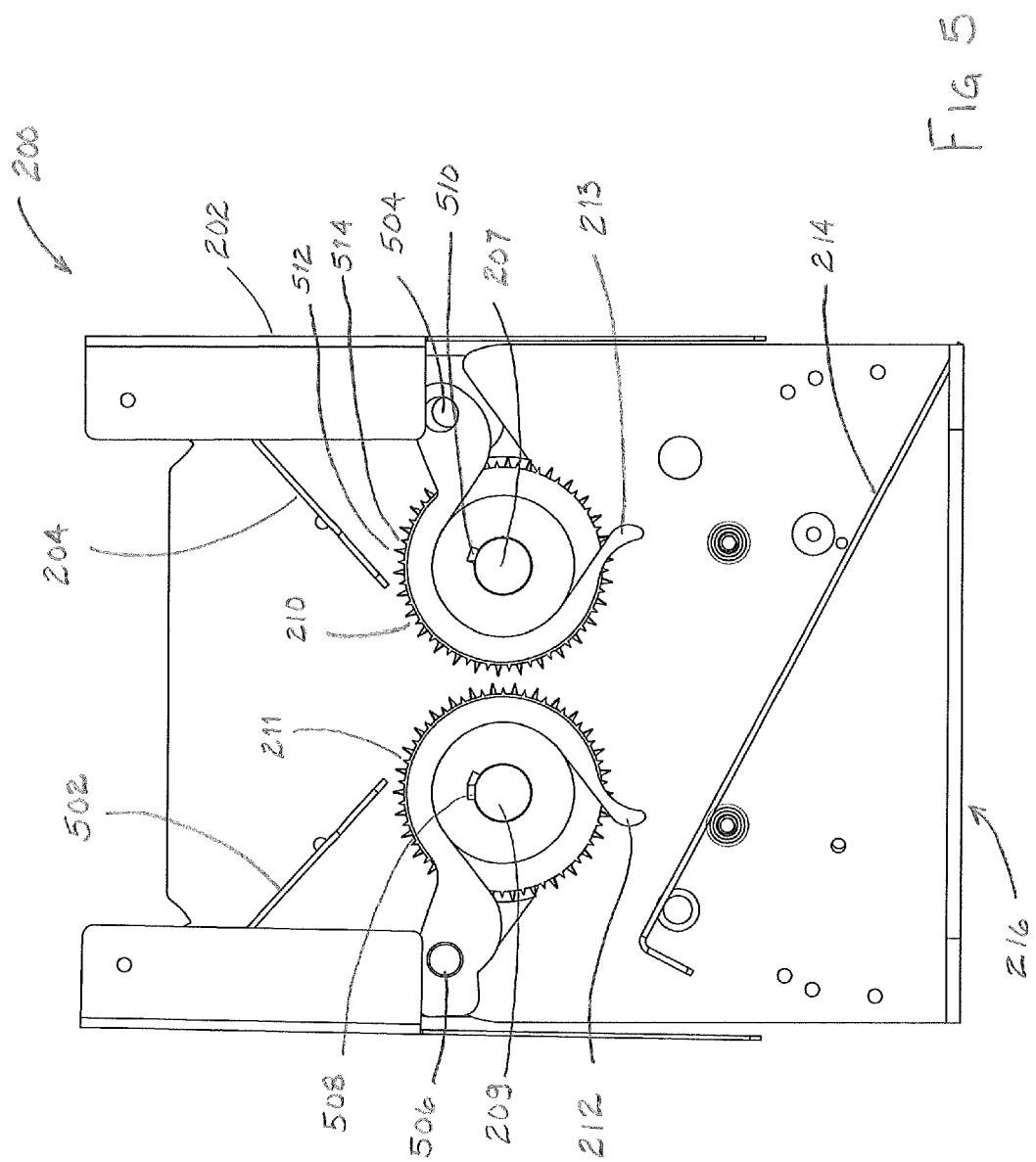

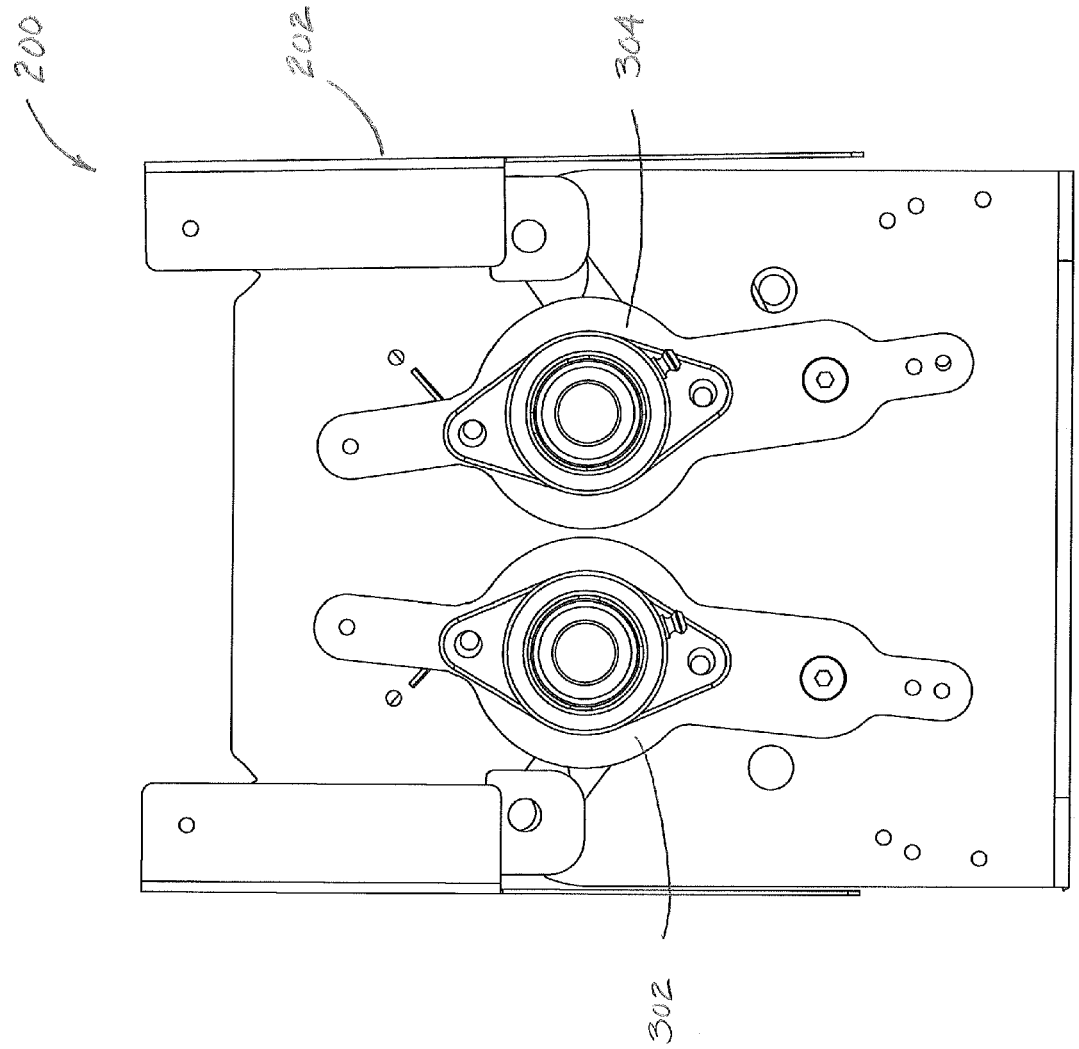

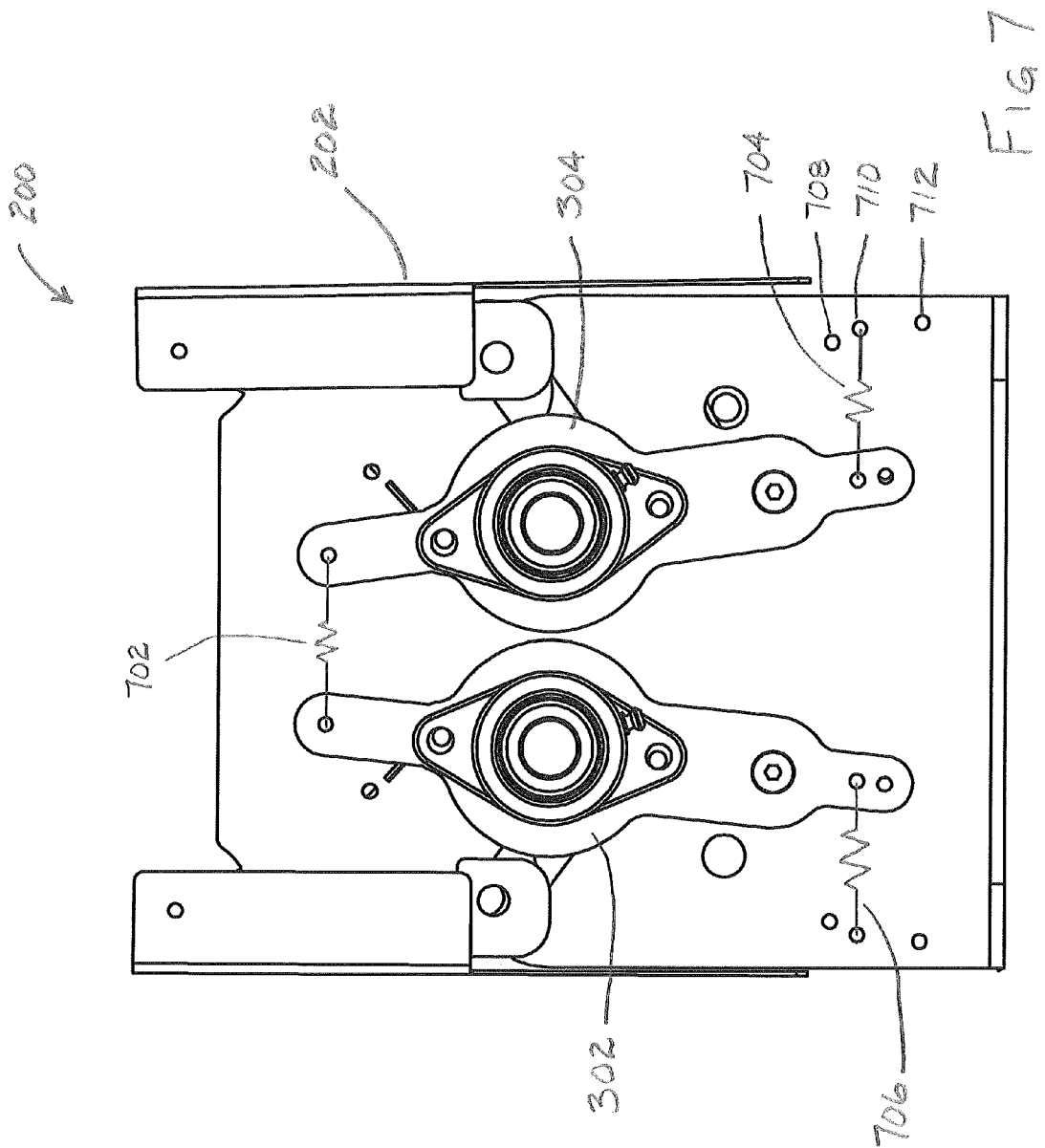

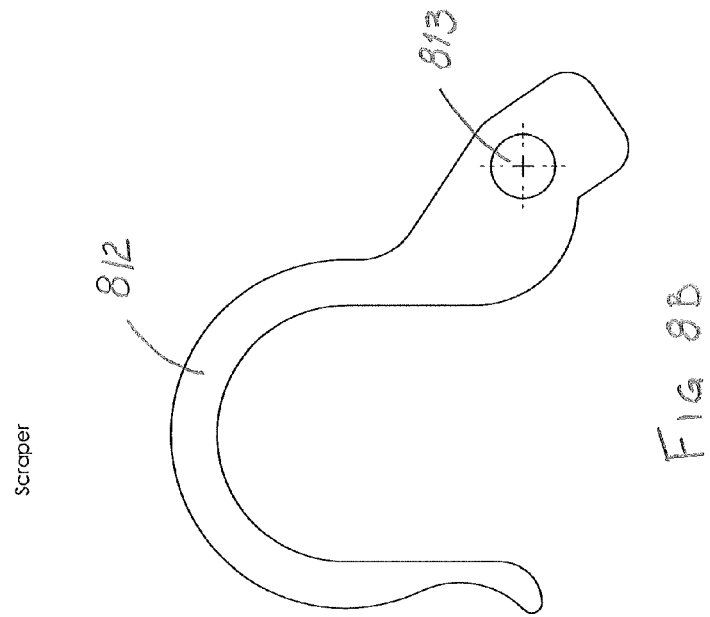
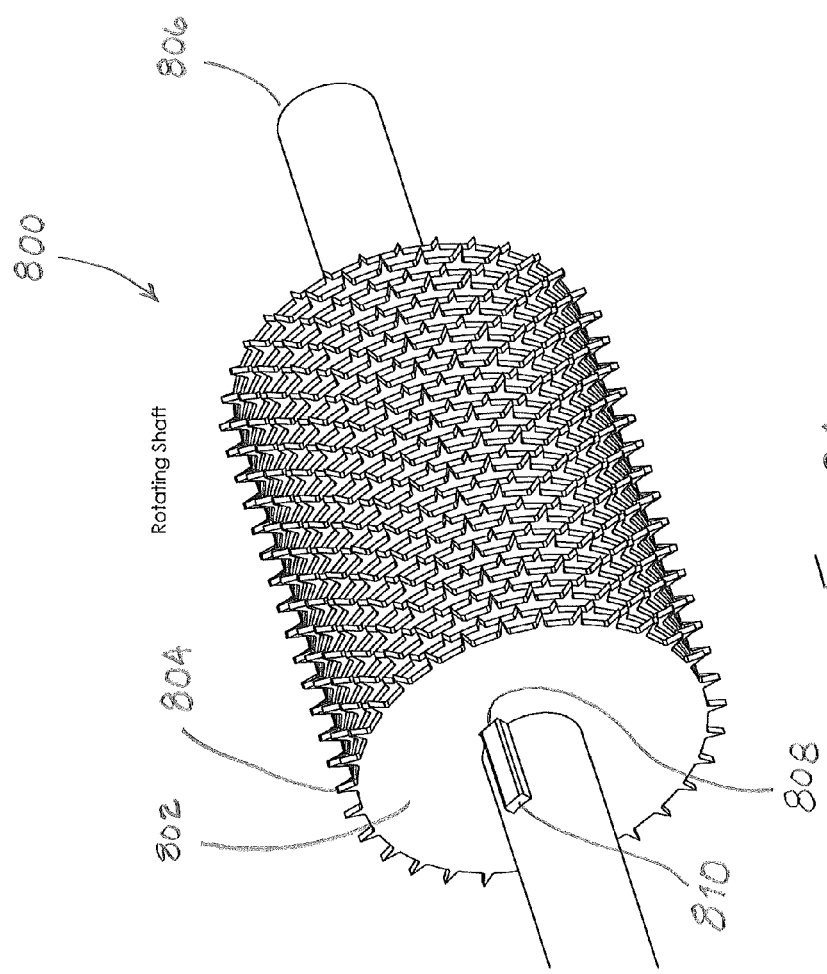

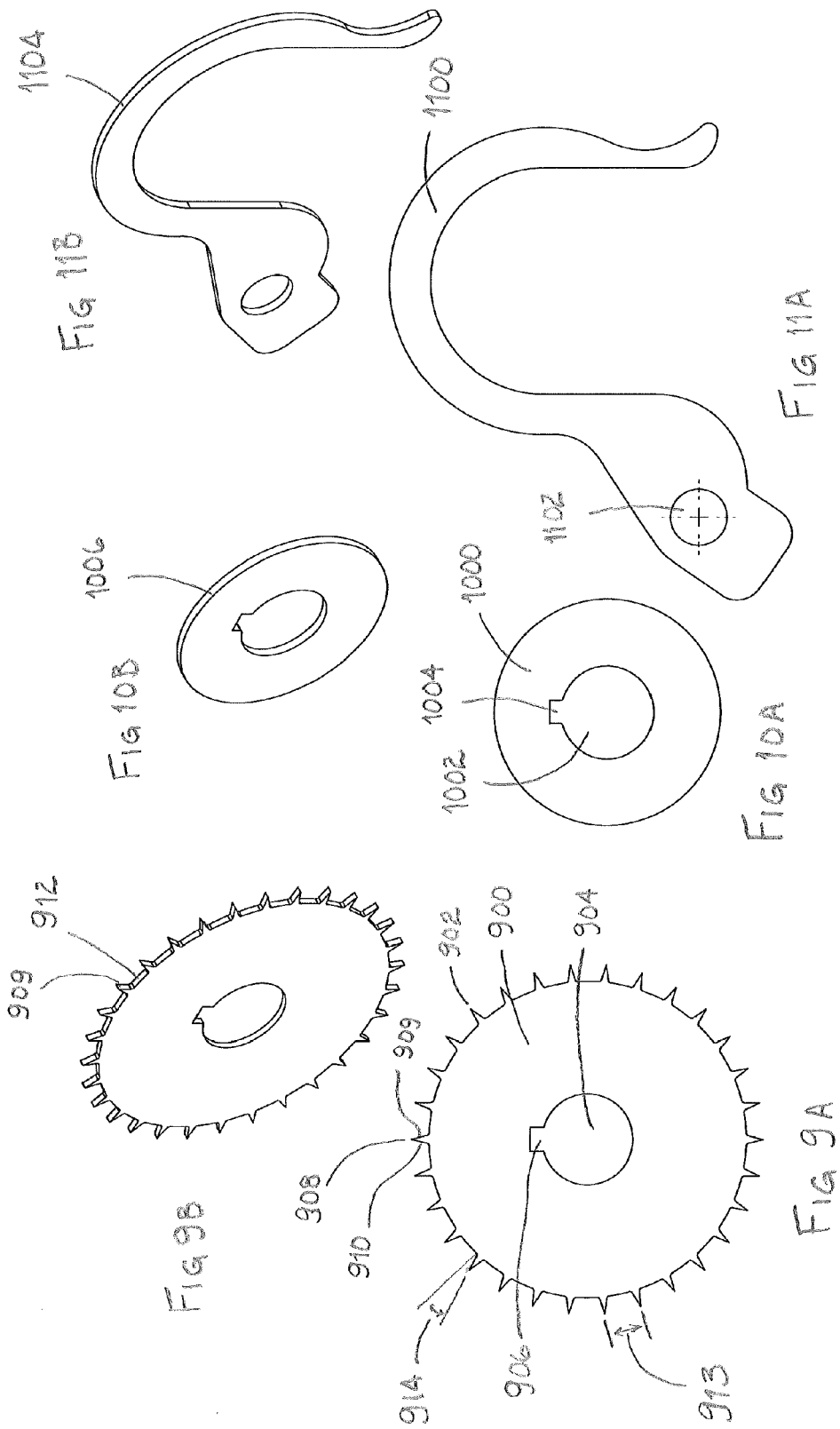

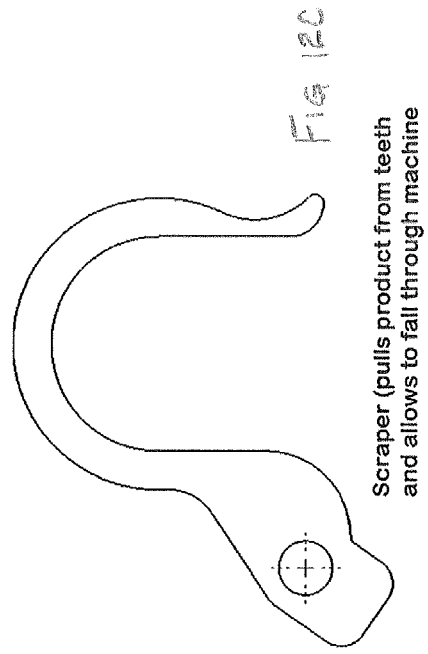
Cutter  FIG 12A
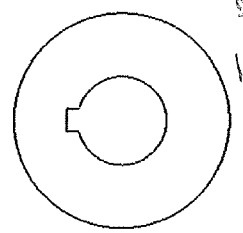
Spacer
(Can be multiple)
FIG 12B
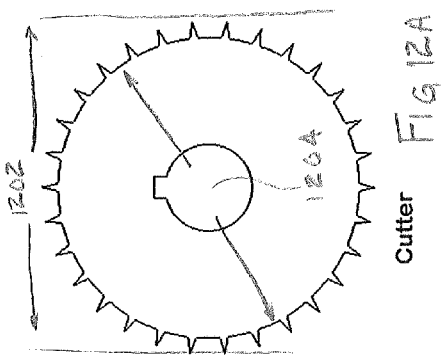
Scraper (pulls product from teeth and allows to fall through machine)
FIG 12C
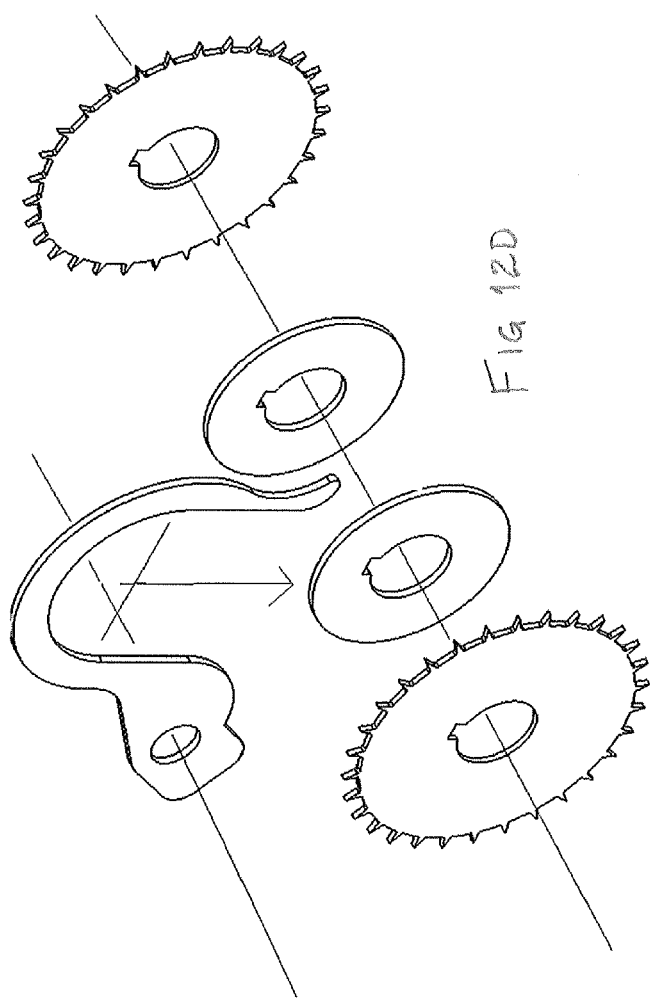
FIG 12D

METHOD AND APPARATUS FOR PREPARING POULTRY SKIN

CROSS-REFERENCE TO RELATED APPLICATIONS

This application is a divisional of and claims priority to U.S. patent application Ser. No. 13/801,504, filed Mar. 13, 2013.

BACKGROUND

1. Field

This technology relates generally to preparing poultry skin and, more particularly, to preparing poultry skin for breading or glazing 2. Background Art Good adhesion of batter, breading, glaze or other products to the skin of a poultry product is important for those poultry products having such a coating applied. The skin of poultry has an outer layer referred to as the cuticle of the skin. Breading and other coating products tend to adhere better to the poultry product if the outer cuticle is removed. The skin of poultry has essentially three layers with the outer most layer being the Stratum Corneum (cuticle), the middle being the Stratum Germinativum, and the inner most being the dermis. It is commonly accepted that removal of the cuticle results in better adhesion of breading. A common method to remove the cuticle is to expose the skin to a high scalding temperature ($\geq 60°$ C.), which results in removing the outer cuticle layer. Removing the cuticle improves adhesion of coating material because particles of the coating material can lodge between the protrusions and recesses of the Stratum Germinativum once the cuticle is removed. However, this high scalding process can reduce the yield of the poultry item by 4-6% and can result in skin discoloration if dehydrated during a later air chilling process.

A better method and apparatus is needed for achieving better coating adhesion to s poultry item that does not significantly reduce the yield of the poultry item.

BRIEF SUMMARY

The technology disclosed and claimed herein is a method and apparatus for improving adhesion of a coating material to a poultry item without scalding the item to thereby remove the cuticle. The method can include penetrating the skin of the poultry item with an array of small holes with minimal to no penetration of the underlying muscle. Penetrating the skin of a poultry item with an array of small holes can be accomplished by using a plurality of circular blades laterally spaced apart and substantially parallel and having a plurality teeth radially protruding (extending) from the edge of the blades and forcibly engaging and penetrating the skin of the poultry item with the plurality of teeth. The plurality of circular blades can have a common axis of rotation and can be rotated about a shaft extending along the common axis thereby forming a roller of blades, which can simply be referred to as a roller. An implementation of the method can include passing a poultry item between two parallel opposing rollers (roller pairs configured in a "press roller" or "pinch roller" configuration with a roller gap between the pair) whose respective axis of rotation lay in a common plane and are proximately spaced apart and urging the opposing rollers inward one with respect to the other thereby engaging the poultry item passing there between with the radially extending teeth. Urging inward the roller of blades can effect penetrating the skin of the poultry item with the teeth of the blades. The rollers can be oppositely and inwardly rotated to pass the product there through. As the poultry item passes between the rollers (through the roller gap), the teeth of the plurality of blades can be urged inwardly to effect penetration of the skin.

One implementation of the apparatus can include a plurality of circular blades laterally spaced apart and substantially parallel and having a plurality teeth radially protruding from the edge of the blades for forcibly engaging and penetrating the skin of the poultry item. The plurality of circular blades can have a common axis of rotation and can be rotated about a shaft extending along the common axis thereby forming a roller of blades, which can simply be referred to as a roller. An embodiment of the apparatus can include two parallel opposing rollers whose respective axis of rotation which lay in a common plane and are proximately space apart forming a roller gap. The opposing rollers can be spring loaded for urging the opposing rollers inward one with respect to the other to thereby engage a poultry item passing there between. One implementation can include multiple pairs of rollers through which a poultry item can pass.

The method and apparatus can improve the process of breading poultry items where the breading or other coating better adheres to the product without using a high scalding process for removing the cuticle. These and other advantageous features of the present invention will be in part apparent and in part pointed out herein below.

BRIEF DESCRIPTION OF THE DRAWINGS

For a better understanding of the present invention, reference may be made to the accompanying drawings in which:

FIGS. 2-7 is an illustration of a roller and housing assembly;
FIG. 8A is an illustration of a roller assembly;
FIG. 8B is an illustration of a scraper;
FIGS. 9A-9B is an illustration of a blade;
FIGS. 10A-10B is an illustration of a spacer;
FIGS. 11A-11B is an illustration of a scraper;
and
FIGS. 12A-12D is an illustration of an arrangement of blades, spacers and scrapers.

LISTING OF ITEMS

Figure 1B:
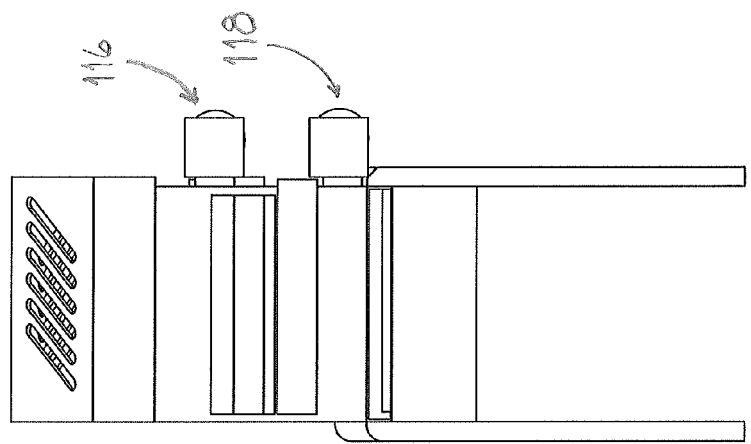
FIGS. 1A-1C is an illustration of a pre-breading assembly.

100 Pre-Breading Assembly
102 In-feed Conveyor
104 Top Roller Pair
106 Take-Away Conveyor
108 Intermediate Roller Pair
110 Bottom Roller Pair
112 Bottom Chute
114 Bottom Chute Opening
116 Synchronization Drive
118 Synchronization Drive
200 Roller and Housing Assembly
202 Housing Assembly
204 Top Roller Assembly Chute
206 Roller Assembly
207 Roller Shaft
208 Roller Assembly
209 Roller Shaft
210 Blade Stack
211 Blade Stack
212 Scrapers
213 Scrapers
214 Bottom Roller Assembly Diverter Chute 216 Bottom Roller Assembly Chute Opening
302 Regulator
304 Regulator
502 Top Roller Assembly Chute
504 Scraper Mount
506 Scraper Mount
508 Blade Key
510 Blade Key
512 Staggered Teeth
514 Staggered Teeth
702 Expansion Spring
704 Compression Spring
706 Compression Spring
708 Spring Adjustment
710 Spring Adjustment
712 Spring Adjustment
800 Roller Assembly
802 Blade Stack
804 Blade Teeth
806 Roller Shaft
808 Blade Key
810 Retention Key
812 Scraper
813 Scraper Mount
900 Blade
902 Teeth
904 Blade Hub
906 Hub Key
908 Tooth Point
909 Leading Edge
910 Trailing Edge
912 Gullet
913 Pitch
914 Rake Angle
1000 Spacer
1002 Spacer Hub
1004 Spacer Key
1006 Spacer Thickness
1100 Scraper
1102 Scraper Mount
1104 Scraper Thickness
1202 Tooth Diameter
1204 Gullet Diameter While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF INVENTION

According to the embodiment(s) of the present invention, various views are illustrated in FIGS. 1-12 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the present technology comprising a roller assembly including a roller pair each having a blade stack teaches a novel apparatus and method for preparing a poultry item for breading.

Figure 1A:
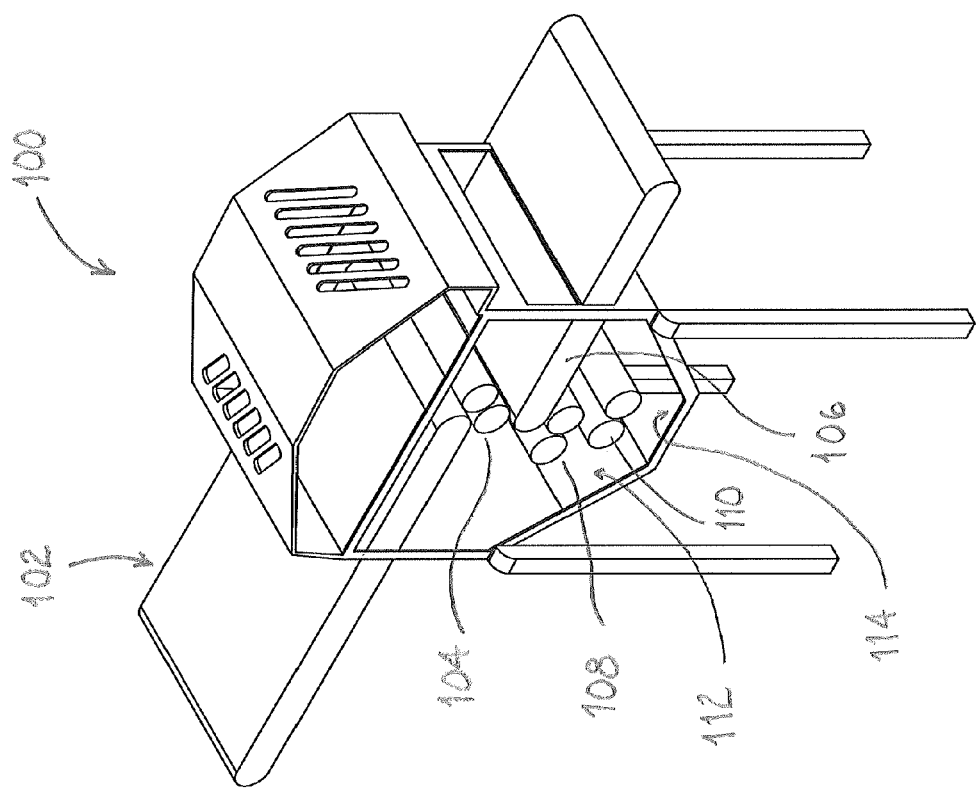
Figure 1C:
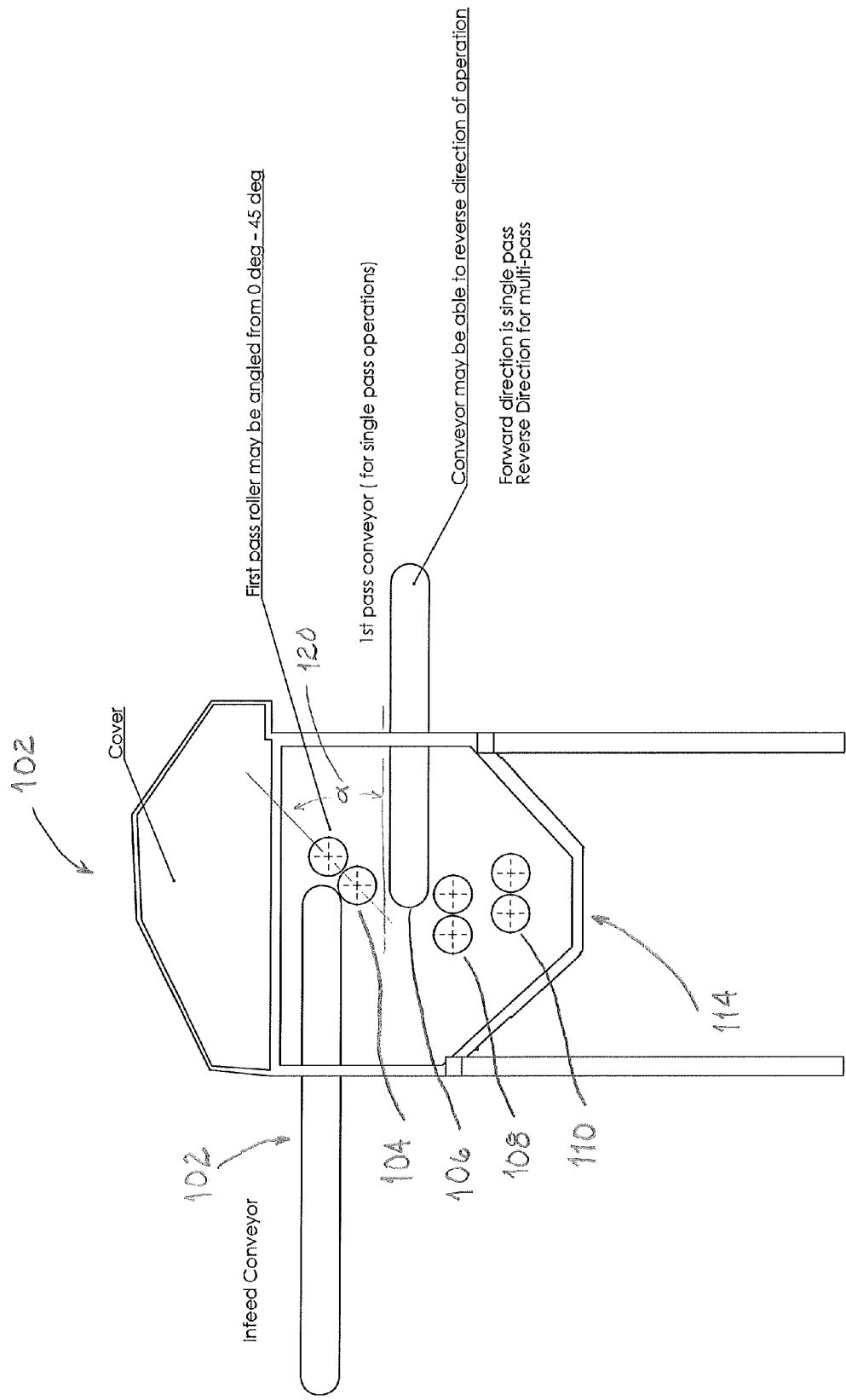

The details of the invention and various embodiments can be better understood by referring to the figures of the drawing. Referring to FIGS. 1A-1C, an illustration of a pre-breading assembly is shown. The pre-breading assembly 100 includes a system of integrated components including an in-feed conveyor 102 which carries the poultry items, for example poultry wing portions, into the poultry pre-breading assembly for preparing the poultry item for breading. The conveyor 102 feeds the poultry items into the top roller pair 104 to begin the perforation process (penetrating the skin with a plurality of holes). The two rollers within the pair extend in parallel one with respect to the other. The axis of rotation for each roller within the pair extending parallel and lay within a common plane. The common plane within which the two axis lay can be oriented at a substantially 45° angle with respect to horizontal as shown. This 45° orientation can assist in feeding the poultry items into the top roller pair from the infeed conveyor to begin the perforation process. The 45° angle orientation will facilitate the transition of the poultry item from the conveyor into the roller pair. Therefore, as the poultry item is being conveyed toward the roller pair, as the poultry item transitions between the roller pair, the orientation of the poultry item can be maintained. For example, if a breast filet portion is being conveyed and is laying flat on the conveyor, then the flat orientation of the breast portion can be maintained as it fed into the roller pair.

The pre-breading assembly also includes an intermediate take-away conveyor 106 which can convey the poultry item away from the pre-breading assembly for further processing. In one embodiment, however, the take-away conveyor can be reversed in direction in order to transition the poultry item to engage an intermediate roller pair and a lower roller pair. Additional take-away conveyors can be included in the pre-breading assembly to carry the poultry item away from the pre-breading assembly once it has passed through the intermediate and bottom roller pairs. The intermediate roller pair and the lower roller pair 108 and 110 respectively are shown such that the common plane in which their axis lay is oriented substantially horizontal. This orientation allows the poultry item to fall through and engage the intermediate and bottom roller pairs for further preparation. Once the poultry item has transitioned through the intermediate roller pair and the bottom roller pair, the bottom chute 112 and bottom chute opening 114 can channel the poultry item to a lower take-away conveyor, not shown, which can take the poultry item that is now perforated away from the pre-breading assembly for subsequent application of a coating. The bottom chute 112 and the bottom chute opening 114 can be adapted to channel the poultry items onto the take-away conveyor. The pre-breading assembly can also include synchronization drives 116 and 118, which can synchronize the rotation of the conveyors and the roller pairs.

Referring to FIGS. 2-7, an illustration of a roller and housing assembly is shown. The perspective view of the roller and housing assembly 200 provides further detail of its operation. The roller and housing assembly 200 includes a housing assembly which houses the roller assemblies or roller pairs that provide the perforation of the poultry items. The housing assembly 202 provides a protective covering of the roller assembly in order to prevent injury of any operators. The roller and housing assembly includes a top roller assembly chute 204 which directs poultry items falling therethrough into the roller assemblies. The roller pair includes two roller assemblies 206 and 208 and each roller assembly includes a roller shaft 207 and 209 about which the blades rotate. The pair of rollers can be configured in a press roller (pinch roller) configuration with a roller gap there between.

Each roller assembly 206 and 208 includes a blade stack 210 and 211, where each blade stack includes a plurality of circular blades aligned side-by-side one with respect to the other where each of the plurality of blades have a common axis rotation. The blade stacks 210 and 211 can also include spacers, which provide space between each adjacent blade as well as scrapers 212 and 213 which are designed to scrape away any poultry item or portions thereof that may cling or stick to the blade stack. The scrapers 212 and 213 will remain in a fixed position to thereby remove any poultry item or portions thereof.

The roller and housing assembly can also include a diverter chute 214 which can divert the perforated poultry item as it falls through the roller pair. If the diverter 214 is not present, the bottom chute opening 216 can channel the poultry items downward through to a conveyor or to another roller and housing assembly. The roller and housing assembly 200 can also include regulators 302 and 304 for each of the rollers within the pair. The regulators can regulate the inward tension or force being applied against the poultry item. The top roller assembly chute 502 and 204 can be angled inward to channel a poultry item to be engaged between the roller pair.

When the blades of the roller engage the poultry item to begin perforation, it is not uncommon for the poultry item to cling to or adhere to the blade stack, therefore scrapers 212 and 213 are fixedly mounted at mount points 504 and 506 such that the scrapers can remove any poultry item or portions thereof from the blade stack such that they are channeled down through to the diverter. Each of the blades can have a blade key 508 and 510 such that they are keyed in a fixed position with respect to the shaft of the roller assemblies 207 and 209 as they rotate. The keys 508 and 510 can be simply a notch in the hub area of each blade such that the blades can be aligned accordingly. The blades can be keyed such that each adjacent blade is rotationally shifted with respect to the other adjacent blade such that the teeth of each adjacent blade is offset with respect to the previous blade. Blade teeth 512 and 514 illustrate the offset arrangement of adjacent blades. Each blade is shifted half a cycle with respect to the adjacent blade. The regulators 302 and 304 can be spring-loaded by springs 702, 706 and 704. The spring tensions can be adjusted as shown by adjustment points 712, 710 and 708. The springs 702, 704 and 706 can be accomplished using various components including traditional springs and more sophisticated cylinders or actuators.

Referring to FIG. 8A, an illustration of a roller assembly is shown. The roller assembly 800 is shown with a blade stack 802 for each of the plurality of blades within the blade stack has blade teeth 804. The roller assembly 800 also includes a roller shaft 806. The blade key 808 is keyed into position by mating with or engaging the blade retention key 810 attached to the roller shaft. The blade stack 802 can include spacers between each adjacent blade as well as including multiple scrapers 812 within the stack. Each scraper 812 will have a scraper mount 813 which can be fixedly mounted in order to remove any debris, poultry items or portions thereof that stick to the blade stack.

Referring to FIG. 8B, an illustration of a scraper is shown. A scraper member 212 can have an arcuate hook-shaped extension member 812 (appendage) positioned between a pair of immediately adjacent circular blades, where the arcuate hook-shaped extension member is substantially centered on the common circular blade axis of rotation. The scraper can be mounted using the scrape mount mounting hub 813 such that it is fixed with respect to the rotating circular blades.

Referring to FIGS. 9A-9B, an illustration of a blade is shown. The circular blades 900 include a plurality of teeth 902 extending from the edge of the blade radially outward. Each circular blade can include a blade hub 904 which mounts on the roller shafts. Each blade hub 904 can have a keyed area or recess or notch 906 which can lock the blade in position when installed on the roller shaft. The teeth of the blade can include a point 908 and leading and trailing edges 909 and 910 respectively. The leading edge and the trailing edge can have an angle that is substantially the same. The angle of the leading edge 914 can be sufficiently steep to facilitate penetration into the skin portion of the poultry item that it engages. The point and angle of each tooth can be optimized to effect perforation of the skin of the poultry item without perforating the underlying muscle of the poultry item. The pitch or distance between each of the teeth 913 can also be optimized such to facilitate perforation of the poultry item. The angle of the leading and trailing edge of each tooth as well as the pitch between the teeth are optimized to effect perforation of the skin of the poultry item without requiring extensive force to effect the perforation. A blade design is selected such that the teeth have a pitch that is sufficiently spaced to avoid increased force being required in order to effect perforation. It has been found that the smaller the pitch between the teeth, the more force is required. The angle of the leading face 909 is also sufficiently steep to facilitate perforation without excessive force being required. The distance between the gully 912 and the point of the tooth 908 can be optimized such that the teeth will effect perforation of the skin without penetrating beyond the skin layers into the muscle structure. The blades can be keyed such that adjacent blades are staggered a half cycle one with respect to the other such that the point of each tooth of a blade is positioned mid-way of the gulley of the adjacent blade.

Referring to FIGS. 10A-10B, an illustration of a spacer is shown. The spacers 1000 can be placed between adjacent blades to provide adequate separation between the circular blades. The spacers 1000 can be utilized to obtain optimal spacing between the blades in order to effect perforation as required for subsequent breading. One or more spaces 1000 can be utilized between adjacent blades. Each spacer 1000 includes a spacer hub 1002 which mounts over the roller shaft similar to that of the circular blades. Each hub 1002 includes a keyed area 1004 to allow the spacers to remain fixed when rotating with respect to the shaft. The thickness of the spacer 1006 can be optimized to affect the appropriate spacing between adjacent circular blades.

Referring to FIGS. 11A-11B, an illustration of a scraper is shown. The scrapers 1100 can an extension or appendage that is curved in a hook-like manner in order to fit around the roller shaft. The scrapers 1100 can also be fixed using the mount 1102 of the scraper. If scrapers are utilized between adjacent blades, the thickness 1104 of the scrapers can also be utilized as a spacing means for providing space between adjacent blades.

Referring to FIGS. 12A-12D, an illustration of an arrangement of blades, spacers and scraper is shown. Each circular blade can have a tooth diameter 1202 and a gullet diameter 1204. The difference between the tooth diameter and the gullet diameter will define the height of the teeth extending from the edge of the blade. The height of the teeth can be optimized to effect penetration of the poultry skin layers without penetrating into the underlying muscle. The illustration in FIG. 12D illustrates an exploded view of and implementation of the arrangement of the blades with spaces therebetween and a scraper between the two spacers.

The various poultry item preparation examples shown above illustrate an apparatus and method for preparing a poultry item for breading. A user of the present technology may choose any of the above embodiments, or an equivalent thereof, depending upon the desired application. In this regard, it is recognized that various forms of the subject embodiments could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

The various implementations and examples shown above illustrate a method and apparatus for preparing poultry items for breading or other coating. A user of the present method and system may choose any of the above implementations, or an equivalent thereof, depending upon the desired application. In this regard, it is recognized that various forms of the subject poultry item method and apparatus could be utilized without departing from the spirit and scope of the present implementation.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present implementation. Accordingly, the specification and drawings are to be regarded in an illustrative rather than a restrictive sense.

Other aspects, objects and advantages of the present invention can be obtained from a study of the drawings, the disclosure and the appended claims.

What is claimed is:

1. An apparatus for preparing a skin of an item for breading comprising:
    roller pairs extending lengthwise in parallel one with respect to the other such that the respective axis of rotation for each roller of the pair lay within a common plane and such that the rollers are proximately space apart forming a gap there between, and where each roller of the pair has a plurality of circular blades adjacently mounted on a drive shaft and proximately spaced apart and each circular blade having a common circular blade axis of rotation with respect to the other circular blades, and where each circular blade has a plurality of teeth radially extending from a cutting edge of each circular blade, and where each roller is spring loaded where each applies an inward opposing force and allows variance in the gap between the rollers, and further comprising a scraper member having an arcuate hook-shaped extension positioned between immediately adjacent circular blades, where the arcuate hook-shaped extension member is substantially centered on the common circular blade axis of rotation.

2. The apparatus as recited in claim 1, wherein the common plane is at a 45° angle with respect to horizontal.

3. The apparatus as recited in claim 2, further comprising:
    an infeed conveyor having an entry end and an exit end of an upper run where the exit end of the upper run is aligned and positioned vertically to feed items being conveyed on the upper run into the gap between the rollers.

4. A method for preparing a skin of an item for breading comprising the steps of:
    conveying a poultry item horizontally along a conveyance path and feeding the poultry item into a top opening of a chute directing the poultry item into a roller gap between a pair of rollers where each roller of the pair of rollers has a plurality of proximately spaced approximately mounted circular blades each blade having radially extending teeth and where the axis of rotation of each roller of the pair of rollers lay in a common plane;
    urging each roller inwardly one with respect to the other and inwardly rotating each roller, thereby engaging the poultry item with the radially extending teeth penetrating the skin of the poultry item creating a plurality of holes in the skin of the poultry item; and
    preventing portions of the poultry item from clinging to the pair of rollers using a scraper having an arcuate hook-shaped extension position between immediately adjacent circular blades.

5. The method as recited in claim 4, further comprising the steps of:
    feeding a poultry item into a lower roller gap between a pair of lower rollers where each lower roller of the pair of lower rollers have radially extending lower teeth and where the axis of rotation of each lower roller of the pair of lower rollers lay in a lower common plane; and
    urging each lower roller inwardly one with respect to the other and inwardly rotating each lower roller, thereby engaging the poultry item with the radially extending lower teeth penetrating the skin of the poultry item creating a second plurality of holes in the skin of the poultry item.

6. The method as recited in claim 5, further comprising the steps of:
    conveying the poultry item away for breading.

* * * * *